US010320920B2

(12) United States Patent
Mishra

(10) Patent No.: US 10,320,920 B2
(45) Date of Patent: Jun. 11, 2019

(54) AUTOMATIC MIGRATION OF COMMUNICATION SESSIONS USING A PRIVATE CLOUD-CLOUD TECHNOLOGY

(71) Applicant: Bank of America Corporation, Charlotte, NC (US)

(72) Inventor: Amit Mishra, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 186 days.

(21) Appl. No.: 15/602,236

(22) Filed: May 23, 2017

(65) Prior Publication Data

US 2018/0343310 A1 Nov. 29, 2018

(51) Int. Cl.
*H04L 29/06* (2006.01)
*H04L 29/08* (2006.01)

(52) U.S. Cl.
CPC .......... *H04L 67/148* (2013.01); *H04L 63/083* (2013.01); *H04L 63/0861* (2013.01); *H04L 63/107* (2013.01); *H04L 63/108* (2013.01)

(58) Field of Classification Search
CPC ..... H04L 67/148; H04L 63/08; H04L 63/083; H04L 63/0861; H04L 63/0869; H04L 63/107; H04L 63/108; G06F 21/31
USPC ................... 726/2–7; 713/168–170
See application file for complete search history.

(56) References Cited

U.S. PATENT DOCUMENTS

| | | | |
|---|---|---|---|
| 6,088,451 A * | 7/2000 | He | H04L 63/20 380/255 |
| 7,308,261 B2 * | 12/2007 | Henderson | H04L 51/04 455/410 |
| 8,019,918 B2 * | 9/2011 | Otsuka | H04N 1/00222 709/220 |
| 8,285,681 B2 | 10/2012 | Prahlad et al. | |
| 8,464,322 B2 * | 6/2013 | Narjala | H04L 12/2807 709/223 |
| 8,527,549 B2 | 9/2013 | Cidon | |
| 8,762,642 B2 | 6/2014 | Bates et al. | |
| 8,769,628 B2 * | 7/2014 | Patel | H04L 67/1097 726/4 |
| 8,788,628 B1 | 7/2014 | Taylor et al. | |
| 8,805,951 B1 | 8/2014 | Faibish et al. | |
| 8,805,968 B2 | 8/2014 | Taylor et al. | |
| 8,832,820 B2 | 9/2014 | Barjatiya et al. | |
| 8,843,616 B2 | 9/2014 | Ochoa et al. | |
| 8,850,130 B1 | 9/2014 | Aron et al. | |
| 8,942,671 B2 * | 1/2015 | Haynes | H04L 63/0428 379/93.01 |
| 9,147,195 B2 | 9/2015 | Sivaramakrishnan et al. | |
| 9,256,374 B1 | 2/2016 | Aron et al. | |
| 9,398,087 B1 | 7/2016 | Hosie et al. | |
| 9,424,437 B1 | 8/2016 | Ancin et al. | |

(Continued)

*Primary Examiner* — Hosuk Song
(74) *Attorney, Agent, or Firm* — Michael A. Springs

(57) ABSTRACT

The migration of a communication session from one device to another device may include registering at least two devices, authenticating user credentials at the second device, determining whether transfer of the session is authorized, storing session information associated with the session, transmitting the stored session information to the second device, and receiving a request that incorporates the transmitted session information to restore the communication session on the second device. In addition, access to the system may be prohibited from the first device for a predefined period of time.

20 Claims, 3 Drawing Sheets

(56) References Cited

U.S. PATENT DOCUMENTS

| | | |
|---|---|---|
| 9,454,398 B2 | 9/2016 | Hacker |
| 9,513,835 B2 | 12/2016 | Alatorre et al. |
| 9,565,200 B2 | 2/2017 | Bacastow et al. |
| 9,600,316 B2 | 3/2017 | Dournov et al. |
| 2017/0039218 A1 | 2/2017 | Prahlad et al. |

\* cited by examiner

AUTOMATIC MIGRATION OF COMMUNICATION SESSIONS USING A PRIVATE CLOUD-CLOUD TECHNOLOGY

TECHNICAL FIELD

The present disclosure relates to migrating sessions in a cloud, and more particularly to migrating active communications session between devices using a private cloud.

BACKGROUND

Many networks permit users to connect to the network from more than one device. For some users, it may be cumbersome to deactivate an active communication session on one computing device only to activate substantially the same communication session on a different computing device and navigate back again to their previous position or webpage. To provide a more user-friendly experience, systems and methods may be provided to permit the seamless migration of an active communication session from one device to another device.

SUMMARY OF THE DISCLOSURE

In accordance with the present disclosure, a system for migrating communication session between devices is provided which substantially eliminates or reduces disadvantages and problems associated with previous systems and methods.

According to a particular embodiment, the transfer of a communication session between devices may include registering at least two devices, authenticating user credentials at the second device, determining whether transfer of the communication session is authorized, storing session information associated with the communication session, transmitting the stored session information associated with the communication session to the second device, and receiving a request that incorporates the transmitted session information to restore the communication session on the second device. In particular embodiments, access to the system may be prohibited from the first device for a predefined period of time.

Particular embodiments provide various technical advantages that overcome specific technical problems inherent to management of communication sessions. In particular, the present disclosure provides a flexible framework that overcomes the conventional restrictions inherent to conventional communications environments. Specifically, conventional communications systems are inherently rigid in their ability to only provide access to a communication session from one device at a time. Communication systems are further inherently limited in their inability to preserve the state of a user's session between devices. As a result, those conventional access systems introduce delay in the user experience because the user may be forced to repeat steps or commands to bring the user to the same state in the communication session actively maintained on another device. Embodiments of the present disclosure specifically overcome these problems inherent to inflexible communication environments that may contribute to delays and frustration in the user experience because they provide a flexible system that permits migration of an active communication between devices that overrides routine functionality of conventional communication access regimes. For example, the present disclosure provides a flexible framework that permits the an active communication session to be seamlessly transferred from one registered device to another registered device. In some use cases, for example, a user may be connected to an active communication session from a desktop computer and be permitted to continue that session on their mobile device as they walk away from the desktop. In addition, certain embodiments of the present disclosure preserve the state of the user experience even though the user may be interacting with the system using a different device. As a result, techniques of the present disclosure provide specific solutions rooted in technology to overcome a problem arising in the realm of communication systems.

The unconventional and non-generic arrangement of components of embodiments of the present disclosure provide a technological solution to overcome the shortcomings of conventional communication systems. Embodiments of the present invention may permit the flexible migration of a communication session from one device to another. Permitting such migration results in efficient use of resources and minimizes the number of active communication sessions that may otherwise be required by the system because some users may have multiple communication sessions active from multiple devices. Embodiments of the present invention may also permit the user to continue the communication session uninterrupted from where they left off on the first device without any additional navigation or commands. For example, in the context of webpage or portal, if the user had already navigated from the homepage to particular portion of the webpage, particular embodiments of the present disclosure would allow the user to continue the communication session from that same portion of that webpage without needing to navigate from the homepage to that portion of the webpage again. By employing particular embodiments according to the present disclosure, users may also be able to avoid providing additional user credentials or security questions to gain access to the communication session on the second device (e.g., smartphone). Certain embodiments of the present disclosure may cause migrating of a communication session automatically as result of the user seeking access to the same communication system from a second device. In other embodiments, the user may specifically request a migration of the communication session from one device to another.

Certain embodiments may also enforce network policies or rules associated with the number of devices that are connected to the network by the same user. In certain embodiments, policies may be implemented by using the geographic location of the registered devices seeking access to the network. For example, the system may prohibit migration of an active communication session from one device to another device unless the two devices are within a predefined geographic distance of each other. Particular embodiments may also provide the ability to securely maintain communication session information during a transfer of the communication session from one device to another using the features of a private cloud.

Private networks and other public communication networks like the Internet are relied on by users for an ever-increasing set of essential activities. In general, networks are designed to provide access to a wide set of users to facilitate communication between each other and other networks and servers. However, this open nature of a computer network as an accessible communication resource also makes it a target for malicious activity. The use of secure cloud services, including private cloud services, may protect against such malicious activity. Techniques of the present disclosure solve the specific problem of providing seamless access to an active communication session while maintaining security using a private cloud.

Thus, a framework is disclosed that that may be configured, built and deployed in a network environment to enable migration of a communication session from one device to another across a network using a private cloud.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Embodiments of the present disclosure and its advantages are best understood by referring to FIGS. 1-4, like numerals being used for like and corresponding parts of the various drawings.

Figure 1:
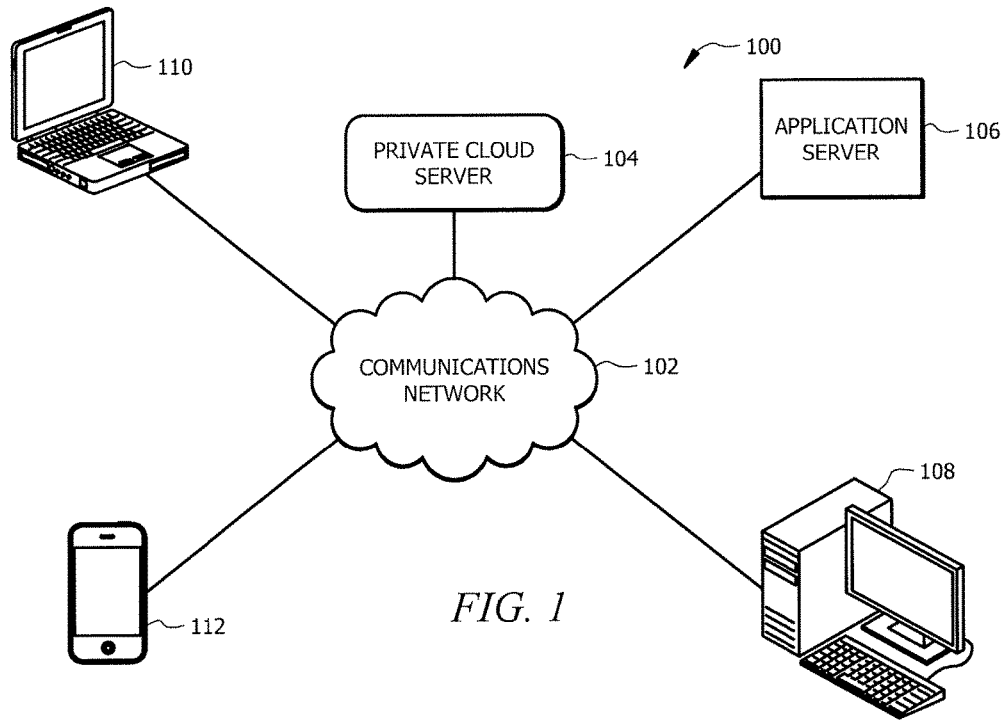
FIG. 1 is a block diagram illustrating a system environment with elements that interoperate to facilitate migrating sessions between devices using a private cloud.

FIG. 1 is a block diagram illustrating a system 100 with elements that interoperate to facilitate migrating communication sessions. The elements of system 100 can support a number of different operations, including registering multiple devices, detecting an active communication session, managing transfer of an active communication from one device to another, determining whether transfer of the active communication device is authorized, and facilitating restoration of the communication session on a different device. Facilitating restoration of the communication session may include storing session information associated with the active communication on a private cloud and communicating that information to another device to restore the communication session. In certain embodiments, once the communication session is restored on the second device, access to the communication session from the first device may be prohibited. In some embodiments, some of these tasks may be performed by servers, such as a private cloud server. In other implementations, these tasks may be performed in a distributed fashion using various components that interface with each other over a network. Embodiments of the present disclosure facilitate managing the migration of communication session from one device to another device both of which may be connected to a common network through a variety of network components. For example, embodiments of the present disclosure may be deployed in an customer environment to allow customers to transfer an active communication from one of their devices to another device.

In the illustrated embodiment, system 100 includes a number of elements interconnected by one or more networks, represented by communications network 102. Communications network 102 represents communications equipment, including hardware and any appropriate controlling logic, for interconnecting elements and facilitating communication between these elements. Communications network 102 may include local area networks (LANs), metropolitan area networks (MANs), wide area networks (WANs), any other public or private network, local, regional, or global communication network such as the Internet, enterprise intranet, other suitable wired or wireless communication link, or any combination thereof. Communications network 102 may include any combination of gateways, routers, hubs, switches, access points, base stations, and any other hardware, software, or a combination of the preceding that may implement any suitable protocol. Communications network 102 may include other types of networks, including wireless or wired networks. The use of communications network 102 facilitates seamless migration of communication sessions between multiple devices regardless of the geographic location or communication protocols employed by network components or devices on the network. While only one communications network 102 has been illustrated, it should be understood that various embodiments may operate using multiple communications networks 102. In addition, various embodiments may employ one or more wired and wireless networks in communications networks 102.

Communications network 102 interconnect other elements of system 100, including private cloud server 104, application server 106, desktop computer 108, laptop computer 110, and mobile device 112. It should be understood that while system 100 is illustrated as including a single communications network connected to specific components, various embodiments may operate using any suitable arrangement and collection of networks and components that enable appropriate communications.

As illustrated, system 100 includes a private cloud server 104 coupled to communications network 102. Private cloud server 104 represents any appropriate combination of hardware, controlling logic, and data for facilitating migration of communication sessions between devices. For example, private cloud server 104 may represent a networked server or collection of networked servers capable of communicating with other elements of system 100 to enable migration of one or more communication session between devices coupled to the communications network 102. In particular embodiments, private cloud server 104 communicate with various devices including, for example, by desktop computer 108, laptop computer 110, and mobile device 112, to perform the operations of the present disclosure. As illustrated, private cloud server 104 couples to communications network 102 to facilitate communication with other elements of system 100. For example, private cloud server 104 may communicate with and retrieve relevant information from application server 106 to migrate communication session between devices coupled to network 102.

Private cloud server 104 may include memory, processors, databases, and appropriate interfaces to couple to other devices or networks. Particular implementation of private cloud server 104 may include the use of one or more data servers or mesh computing environments. In certain implementations, private cloud server 104 may facilitate storage of information associated with an active communication session with a device. Private cloud server 104 may include any suitable combination of volatile or non-volatile, local or remote devices suitable for storing and maintaining information. For example, private cloud server 104 may include random access memory (RAM), read only memory (ROM), solid state storage devices, magnetic storage devices, optical storage devices, or any other suitable information storage device or a combination of such devices. In particular embodiments, private cloud server 104 may include a relational database for storing credentials and information associated with communication sessions in a retrievable manner.

In particular embodiments, private cloud server 104 may store all connection details related to endpoint devices. For example, private cloud server 104 may maintain network activity information corresponding to desktop computer 108, laptop computer 110, and mobile device 112. For example, certain embodiments of private cloud server 104 may store IP addresses/MAC addresses associated with endpoints 106 and Internet Protocol (IP) addresses of such endpoint devices. Private cloud server 104 may be directly or indirectly coupled to other systems such as application server 106 and be capable of storing and retrieving information related to network access or communication sessions. In particular embodiments, the storage and functionality of private cloud server 104 may be provided by a third party data server. In some embodiments, private cloud server 104 may reside on an application server, such as application server 106.

While system 100 depicts a single private cloud server 104, it should be understood that various embodiments may operate using any number of private cloud servers. In addition, various embodiments may incorporate the functionality and/or hardware of private cloud server 104 in other servers, computers, or networks. In particular embodiments, private cloud server 104 would be located on an enterprise or protected network that can be accessed only with the robust user credentials and/or encryption techniques enabled. Although illustrated as a private cloud server, in particular embodiments, private cloud server 104 may be a public cloud server that is universally accessible with limited or no user credentials. In certain embodiments, access to private cloud server 104 may be limited to a private network while in other embodiments private cloud server 104 may be accessed from a public communication network such as the Internet.

The illustrated embodiment of system 100 also includes a application server 106 coupled to communications network 102. Application server 106 represents any appropriate combination of hardware, controlling logic, and data for providing devices access to data or information. For example, application server 106 may represent a networked server or collection of networked servers capable of communicating with other elements of system 100 to communicate with private cloud server 104 to enable migration of one or more communication session between devices coupled to the communications network 102. In particular embodiments, application server 106 may be accessed by various devices including, for example, by desktop computer 108, laptop computer 110, and mobile device 112, to provide communication sessions to those or other devices. As illustrated, application server 106 couples to communications network 102 to facilitate communication with other elements of system 100. For example, application server 106 may communicate with and provide relevant information to private cloud server 104 to migrate communication session between devices coupled to network 102. In particular embodiments, application server 106 may operate as a web server or web portal. According to particular implementations, application server 106 can provide customers with access to their accounts or account information. For example, banking customers may access information about their personal or investment accounts from devices, such as desktop computer 108, laptop computer 110, and mobile device 112, by communicating with application server 106 across communications network 102. In those embodiments, an active communication session may include a banking session with a customer. In order to provide secure access to information or data, application server 106 may require users to provide user credentials. User credentials may include biometric credentials such as fingerprints, voice, iris, face, or other appropriate characteristic of a user suitable to identify and authenticate the user. In certain embodiments, user credentials may include username, password, and security questions.

Application server 106 may include memory, processors, databases, and appropriate interfaces to couple to other devices or networks. Particular implementation of application server 106 may include the use of one or more data servers or mesh computing environments. In certain implementations, application server 106 may enable an active communication session with one or more devices. While system 100 depicts a single application server 106, it should be understood that various embodiments may operate using any number of application servers. In addition, various embodiments may incorporate the functionality and/or hardware of application server 106 in other servers, computers, or networks. In particular embodiments, application server 106 would be located on an enterprise or protected network. In certain embodiments, access to application server 106 may be limited to a private network while in other embodiments private cloud server 104 may be accessed from a public communication network such as the Internet.

The illustrated embodiment of system 100 also includes endpoint devices including desktop computer 108, laptop computer 110, and mobile device 112 coupled to communications network 102. These devices represent any suitable hardware, including appropriate controlling logic and data, capable of connecting to and communicating over a network. For example, desktop computer 108 may represent a workstation used at an enterprise or a desktop personal computer. Laptop computer 110 may represent a personal or business notebook computer. Mobile device 112 may represent advanced phones (e.g, smartphone), Voice over Internet Protocol (VoIP) telephones, mobile phone, tablet, personal digital or data assistants, or other appropriate portable computing device. Endpoint devices coupled to communications network 102 may include wired or wireless devices. Other suitable endpoint devices include, but are not limited to, workstations, laptops or notebook computer systems, printers, Voice over Internet Protocol (VoIP) telephones, IP phones, mobile telephones, advanced phones (e.g., smartphones), personal digital assistants (PDAs), wireless handsets, notebook computer systems, tablet computer systems, embedded devices, auxiliary devices, or the like. In particular embodiments, endpoint devices 106 are capable of transmitting and receiving different forms of media including audio, video, images, text messages, and other data formats, and documents and accessing disparate network-based services. While system 100 depicts particular embodiments of endpoint devices as desktop computer 108, laptop computer 110, and mobile device 112, it should be understood that suitable embodiments may include any device that can be used to initiate, maintain, and interact with a communication session across communications network 102, such as with private cloud server 104 and/or application server 106.

Particular embodiments are designed to operate in a network environment that facilitates the migration of communication sessions between devices using a cloud. In particular embodiments, this process may include registering more than one device associated with a user, detecting an active communication session with a user from a first device, receiving a request to transfer the communication session from the first device to a second device, determining whether that transfer of a communication session is authorized between registered devices, and storing information associated with the communication session in a private cloud and accessing that information from the second device to restore the communication session on the second device. In certain implementations, once the communication session is restored on the second device, access by the user from the first device may be prohibited for a predefined period of time even if that device is registered. For example, a user may initiate a communication session between desktop computer 108 and application server 106 to access information relevant to the user, such as bank account information. After initiating the communication session, the user may wish to access the same communication session from their mobile device 112. For example, a user may wish to access that same communication session on mobile device 112 because they need to leave the location of the desktop computer 108 for any number of reasons, such as attending an in-person meeting. Similarly, if a communication session were initiated on the mobile device 112 and the user returns to the location of desktop computer 108, the user may wish to access that communication session on desktop computer 108. Thus, depending on the scenario, the user may wish to transfer the active communication session from the desktop computer 108 to the mobile device 112, or vice versa. In particular implementations, transferring the communication session has the advantage of the user not losing their position or state in the communication session. For example, if a user has navigated through particular menus on a web communication session, the user would be able to continue where they left off uninterrupted without the need of navigating through those menus again on the second device to reach the same position. To facilitate transfer of the communication session from one device to another device coupled to communications network 102, the system may execute appropriate logic and connect to other systems to save session information, such as a session identifier or other relevant information, associated with the communication session on private cloud server 104 so that it can be used to restore the communication session. In particular embodiments, when a user requests access from a second device after starting a communication from a first device, the user is provided identifying information associated with the communication session, such as a session identifier or other header information, which in turn can be used by the second device to restore the active communication session. The second device may restore the active communication session by using appropriate identifying information corresponding to that communication session in its next request to the private cloud server 104 and/or application server 106. In certain embodiments, application server 106 may communicate with private cloud server 104 to restore a communication session when it receives a request with respect to an active communication session from a second device. In other implementations, private cloud server 104 may communicate with application server 106 to restore a communication session when it receives a request with respect to active communication session from a second device. Systems, methods, and software described by example in the present disclosure may increase the efficiency, speed, and effectiveness of migrating communication sessions between devices coupled to a network in a seamless manner.

In operation, elements of system 100 operate together to perform various network communication functions including but not limited to maintaining a repository of network activity on the network including information related communication sessions, enabling secure authentication of candidate endpoint devices for communication session migration, facilitating identification and verification of communication session information, and permitting the restoration of a communication session from different endpoint devices, and preventing subsequent access to computer systems by the first device for a specified period of time. For example, in particular embodiments, elements of system 100 may allow a network user to effectively restore a communication session on a second endpoint device coupled to the network.

In particular embodiments, one or more endpoint devices, such as desktop computer 108, laptop computer 110, and mobile device 112, connect or seek access to communications network 102. For example, one of endpoint devices may attempt to access communications network 102 through desktop computer 108. In doing so, application server 106 may grant access based on predetermined policies and initiate a communication session with desktop computer 108, such as a banking session. In some embodiments, application server 106 communicates with and stores session information in private cloud server 104 periodically or at specified times or events. In operation, it may be later determined that the user wishes to access the same communication session from a second endpoint device, such as mobile device 112.

For example, a user who has access to a communication session on a desktop computer 108 may elect to access that communication session on a mobile device 112 because the user needs to leave the location of the desktop computer 108 but would like to continue the communication session on mobile device 112. Alternatively, a user who has access to a communication session on mobile device 112 may elect to access that communication session on desktop computer 108 upon their return to the location of desktop computer 112. Using an appropriate user interface, the user may request migration of the active communication session from one endpoint device to another endpoint device of the user. In some embodiments, the user interface may be an interface accessible through a web browser or an application on an endpoint device. In certain implementations, private cloud server 104 may receive identifiers of the first endpoint device and the second endpoint device. Using the identifier of those devices, which in particular embodiments may be an Internet Protocol (IP) address, media access control (MAC) address, geographic location (e.g., GPS coordinates), security token (e.g., 128-bit MD5 or SHA security key) or other appropriate identifier of each device, private cloud server 104 may determine whether the two devices are registered with the system and whether migration of the active communication session from the first endpoint device to the second device is authorized. Registration of a device may occur when an endpoint device first connects to the system. In certain embodiments, once an endpoint device is authenticated or the user requests that a device be remembered by the system as a known device, a security token is generated and sent to the endpoint device for storage. If migration of the active communication session is authorized by the system, relevant communication session information, such as session information found in the header of a message, may be transmitted from the first device, such as desktop computer 118, and maintained on the private cloud server 104 to facilitate restoration of the communication session from a second device, such as laptop computer 110 or mobile device 112. After a user is authenticated on the second device, the private cloud server 104 may transmit the relevant session information associated with the communication session to the second device, which can be used by the second device to initiate requests thereby restoring the communication session. In appropriate embodiments, a network policy may cause the private cloud server 104 to prohibit access to the active a communication session from the first device as a security measure.

In certain implementations, the security token may be used to inform the system that the first device is registered and/or authorized to perform migration of communication sessions between devices. In certain embodiments, determining whether transfer of the communication session is authorized may require comparing the identifier of the first or second device against appropriate fraud rules resident on the system. In other embodiments, determining whether transfer of the communication session is authorized may require receiving the geographic location (e.g., geographic coordinates) of the first and second device and determining whether they are with an acceptable predefined value of each other. In some implementations, if the user has an active communication session on a first endpoint device, the system will require limited or fewer credentials from the user on the second endpoint device. For example, when a user has an active communication session on a first endpoint, the system may not require the user to answer security questions if it is attempting to access the same communication session from another registered device. In other implementations, a full set of credentials may be required if the user requests transfer of an active communication session and the system determines that the two registered devices are not within an acceptable geographic distance of one another. In particular embodiments, once a communication session is transferred from a first endpoint device to a second endpoint device, access from the first endpoint device is prohibited by blacklisting an identifier of the first device for a fixed period of time. In particular embodiments, the private cloud server 104 will maintain a list of fraud rules that may include identifiers (e.g., blacklisted IP or MAC addresses), identifiers of compromised devices (e.g., blacklisted MAC addresses), and/or the geographic location (e.g., geographic coordinates) of registered devices. In certain implementations, maintaining such fraud rules enables the private cloud server 104 and/or application server 106 to enforce policies and block access to communication sessions if appropriate.

Components of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of system 100 and the components within system 100.

While system 100 is illustrated as including specific components arranged in a particular configuration, it should be understood that various embodiments may operate using any suitable arrangement and collection of components capable of providing functionality such as that described. For example, although system 100 is illustrated as including desktop computer 108, laptop computer 110, and mobile device 112, any device capable of providing an interface to the user may be coupled to network 102 and employed within the context of this disclosure. Thus, any suitable device may be registered with the system and employed in accordance with the teachings of the present disclosure. In addition, regardless of the nature of the endpoint device, the communication session may be initiated and migration of the communication session requested using any appropriate interface on the endpoint device such as any suitable web interface or browser that may initiate and provide access to an online communication session.

Figure 2:
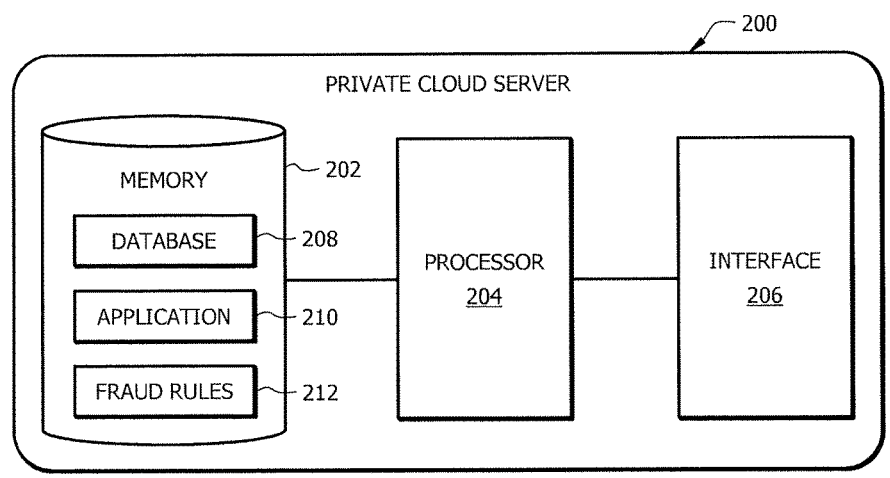
FIG. 2 is a block diagram illustrating an example private cloud server for performing various aspects of migrating sessions between devices.

FIG. 2 illustrates a system 200 as a particular embodiment of private cloud server that is capable of migrating communication session between endpoint devices according to particular control logic. In a particular embodiment, system 200 represents a proprietary private cloud server that facilitates the migration of communication session between devices.

As illustrated, system 200 may include various interconnected elements including a memory 202, a processor 204, and an interface 206. Memory 202 stores, either permanently or temporarily, data, operational software, or other information for processor 204.

Memory 202 represents any suitable combination of volatile or non-volatile, local or remote devices suitable for storing information. For example, memory 202 may include RAM, ROM, solid state storage devices, magnetic storage devices, optical storage devices, or any other suitable information storage device or a combination of such devices. As illustrated, memory 202 includes a database 208, application 210, and fraud rules 212 to facilitate migration of communication session between endpoint devices. Database 208 represents a relational database for storing and organizing various types of network information such as endpoint information (e.g., MAC or IP addresses or geographic location), session information (e.g., session identifier), credentials for authentication (e.g., security token or biometric credentials), and appropriate network policies or rules. In particular embodiments, database 208 may be any suitable database capable of organizing network information.

Application 210 generally refers to logic, rules, algorithms, code, tables and/or other suitable instructions for performing the described functions and operations of system 200. In certain embodiments, application 210 may facilitate the interaction of system 200 with application server 106, desktop computer 108, laptop computer 110, and mobile device 112 using communications network 102.

Fraud rules 212 represents a collection of rules and policies that govern access to the system, including the migration of communication sessions between devices. For example, fraud rules may include a list of blacklisted device identifiers, a list of compromised devices, or rules governing access based the geographic distance between registered endpoint devices. In particular embodiments, fraud rules can be consulted by system 200 to determine whether transfer of a communication from one device to another device is authorized.

Processor 204 represents one or more processing elements, including hardware, logic, and data capable of controlling the operation of system 200. For example, processor 204 may be a computer processor for executing an session migration application stored in memory 202, or any other software or controlling logic associated with system 200, such as an appropriate operating system. According to particular embodiments, processor 204 may be a programmable logic device, a microcontroller, a microprocessor, any other appropriate processing device, or any suitable combination of the preceding.

Interface 206 represents any appropriate combination of hardware and controlling logic for coupling to one or more networks. Interface 206 may support any number of suitable protocols for communicating on a communication network. For example, network interface 206 may be a wired or wireless local area network interface, cellular network interface, satellite interface, and/or any other appropriate interface for communicating on a communication network. Interface 206 may have multiple interfaces for handling different communication protocols.

In operation, processor 204 interacts with interface 206 to receive a request to transfer an active communication session from a first registered device to a second registered device. In certain embodiments, that request may include an identifiers for the first and second devices. System 200 may confirm whether the devices are in fact registered and determine whether migration of the active communication session from the first device to the second device is authorized. Processor 204 may execute appropriate control logic as defined by application 210 to determine whether migration of the active communication session is authorized based on user credentials, device identifiers, and appropriate fraud rules or policies. As appropriate, processor 203 may consult database 208 and fraud rules 212 to determine whether migration is authorized. Once authorized, processor 204 may execute appropriate logic from application 210 to determine maintain relevant session information associated with the communication session in database 208 to facilitate restoration of the communication session from the second device.

System 200 may then receive an access request with user credentials from the second device, and cause processor 204 to execute appropriate control logic as defined by application 210 to authenticate the user and transmit the stored session information from database 208 to the second device. In response to receiving a subsequent request incorporating the transmitted session information, system 200 may cause the active communication session to be restored on the second device. According to appropriate policies, system 200 may cause an identifier of the first device to be entered into fraud rules 212 such that access from the first device is prohibited for a specified period of time. In particular embodiments, processor 204 may execute appropriate logic to generate and transmit security tokens to registered devices and maintain a corresponding security key or token in database 208 to authenticate later access by the registered device to the system. In certain implementations, processor 204 may execute appropriate logic to authorize migration of the active communication session from the first device to the second device only if the geographic location of the first device and the geographic location of the second device are within a predefined value of each other. Thus, system 200 represents an example private cloud server that is operable perform the functions of the present disclosure.

While system 200 is illustrated as including specific components, it should be understood that various embodiments may operate using any suitable arrangement and collection of components. For example, the hardware and/or functionality of system 200 could be incorporated within an application server 106.

Figure 3:
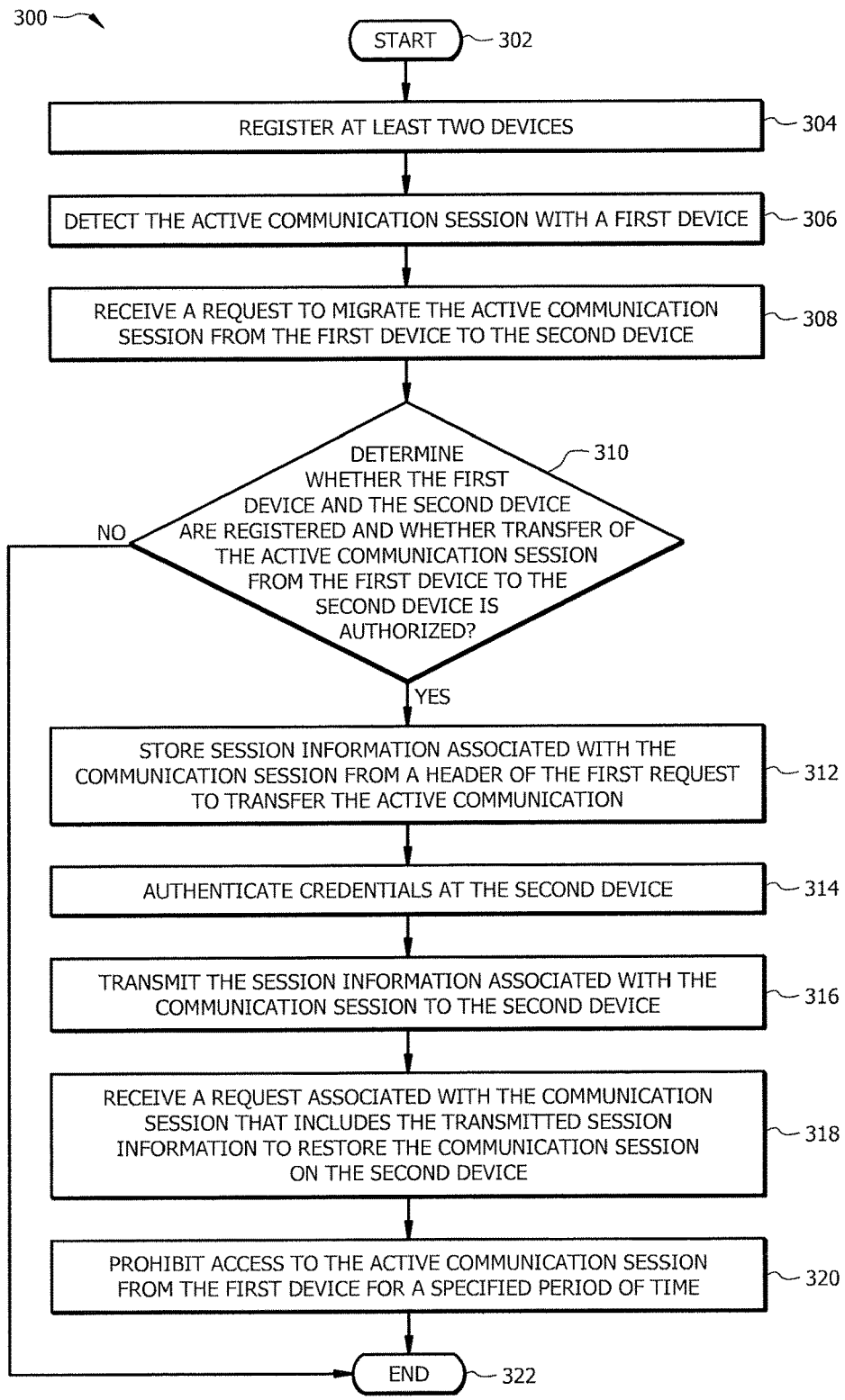
FIG. 3 illustrates an example process flow for migrating a communication session between devices.

FIG. 3 is a process flow diagram illustrating process flow 300 for migrating an active communication session between at least two devices. The steps of process flow 300 correspond to an example sequence of steps for migration of active communication sessions between devices. A process like process flow 300 may be implemented on an appropriate system, such as a private cloud server.

In the illustration, process flow 300 includes a number of steps for determining whether to authorize a migration of an active communication session, and once authorized, various steps for implementing a transfer of the migration an active communication session from one device to another device. As appropriate, network policies may dictate whether, when, and how migration of communication sessions may occur. For example, certain network policies may require the reentry of some or all user credentials to enable the restoration of a communication session on a different device. As shown, the process flow starts at step 302, includes a registration step 304, a detect communication session step 306, a request migration step 308, a registration and authorization decision step 310, a store session information step 312, a authentication step 314, a transmit session information step 316, a request communication step 318, a prohibit access step 320, and ends at step 322. This collection of steps may be performed, for example, on a server, such as private cloud server 200 or application server 106.

In operation, process flow 300 starts at step 302. At step 304, the system may register two or more devices. For example, in registration step 302, the system may require a user to provide credentials on particular endpoint devices, such as desktop computer 108 or mobile device 112. Once authenticated, the system may generate and transmit a security token for storage on each device, which can be later used to authenticate the device as a registered device to the system. In particular implementations, the system may store an appropriate security token or key so that it can authenticate each device as authorized on subsequent access. In particular embodiments, the security token is a unique 128-bit encrypted key, such as an MD5 or SHA key. In this manner, each device may be identified and registered on the system as a candidate device for migration of communication sessions the network.

Next, process flow 300 continues to the detect communication session step 304. In this step, the system determines whether there is an active communication session with a first device. This step may include determining whether the user is authenticated or logged into the system and/or whether there are active session identifiers associated with the user and device. In particular embodiments, the system consults an appropriate database to determine whether there is an active communication session. For example, in particular embodiments, a database may maintain network logs that include communication session information for devices accessing the communication network. In certain embodiments, consulting the database may require communicating over a communication network to another server.

At step 308, the system may receive a request to transfer or migrate a communication session from a first device to a second device. In particular implementations, the user may manually initiate a push of session information to the cloud. In other embodiments, the request to transfer or migration a session from the first device to a second device may be automatic. In certain implementations, the ability to request migration of a communication session requires that certain policies are met. For example, the system may require that at least two devices are registered and migration is requested from one registered device to a second registered device. In other implementations, if only one device is registered, the system will invite the user to register another device by identifying the second device with a unique identifier, such as a phone number, IP address, MAC address, or request that the system send a message (e.g., text or e-mail message) that can be accessed from the second device to trigger a registration of the second device.

Next, process 300 proceeds to registration and authorization decision step 310. In step 310, the system determines whether the first and second devices involved in the transfer communication session request are registered on the system. In particular implementations, the system may compare an identifier of the first and second device with a database to determine whether they are registered. For example, a security token located on the device may be used to determine whether the device has been registered. In other embodiments, the system may use an IP address, MAC address, or other suitable identifier of the device to determine whether it has been previously registered. In this step, the system may also determine whether the migration of the communication session is authorized. In certain embodiments, this may involve consulting appropriate fraud rules to determine whether either of the devices are blacklisted, compromised, or whether other policies or rules are violated. For example, migration of a communication session from one device to another may be permitted only when the two devices are within a predefined geographic distance of each other. In other embodiments, additional or alternative policies may be consulted as appropriate to determine whether migration of a communication should be permitted. In step 310, if it is determined that migration of the communication session is not authorized, then process flow 300 ends at step 322. If, however, process flow 300 determines that migration of the communication session is authorized, then process flow proceeds to step 312.

In step 312, process flow 300 stores session information associated with the active communication session. For example, the system may store the session identifier found in the header of messages associated with a communication session in a database. In other embodiments, the entire header may be stored in a database. For example, all or a portion of the header of the request to migrate communication session from one device to another device may be stored as relevant session information. In other embodiments, additional or alternative information regarding the communication session may be stored to facilitate restoration of the communication session from a different device.

In step 314, process flow 300 authenticates the user's credentials at the second device. In certain embodiments, this may include a username, password, security questions, security token, security questions and answers, and/or biometric credentials (e.g. fingerprint). In particular implementations, the credentials used by the user at the second device may be some subset or all of the credentials that were used by the user to gain access to the system on the first device. In other embodiments, the credentials used by the user on the second device may be alternative credentials (e.g., biometric credentials) that operate as suitable alternatives for all or a subset of the credentials provided on the first device. Once the user is authenticated at step 314, the process flow proceeds to step 316.

In step 316, the system may recognize that the same user associated with an communication session on the first device is attempting to access the communication session from the second device. In response to the user authentication in step 314, the system may transmit, in step 316, the stored session information associated with the active communication session to the second device. The session information could include all or a subset of the header information used in the communication session between the first device and the system. In particular embodiments, the header information includes a session identifier of the active communication session. In alternative embodiments, the session information may only include a session identifier. Process flow then proceeds to step 318.

In step 318, the system receives a request from the second device that incorporates the session information that was transmitted by the system to the second device causing the communication session to be restored on the second device. Because the communication session remained active, the state of the user interaction with the system is not interrupted and the user may continue where it left off. In particular implementations, transfer of a communication session from one device to another must occur within a specified period of time because the communication session may timeout for security reasons. The process flow 300 may then proceed to step 320.

In prohibit access step 320, the system may enforce a policy that prohibits access from the first device for a fixed period of time so that the communication session is not being accessed from two different devices at the same time. In certain embodiments, the system will enforce this policy by creating a fraud rule that blacklists an identifier associated with the first device for a specified period of time. In other embodiments, the system may automatically log the user out of the first device. In alternative embodiments, the first device is prohibited only if the geographic location of the first device and the second device outside of a permissible value of each other. In some implementations, this step is optional and may not be performed. Process flow 300 ends at step 322.

While flow chart 300 is illustrated as including specific steps arranged in a particular sequence, it should be understood that various embodiments may operate using any suitable arrangement and collection of steps capable of providing functionality such as that described. For example, request migration step 308 may be performed before or after detect communication session step 306 and/or determine registration and authorization decision step 310. As another example, determine registration and authorization decision step 310 may be performed before or after detect communication step 306 and/or request migration step 308. Accordingly, modifications, additions, or omissions may be made to flow chart 300 as appropriate.

Figure 4:
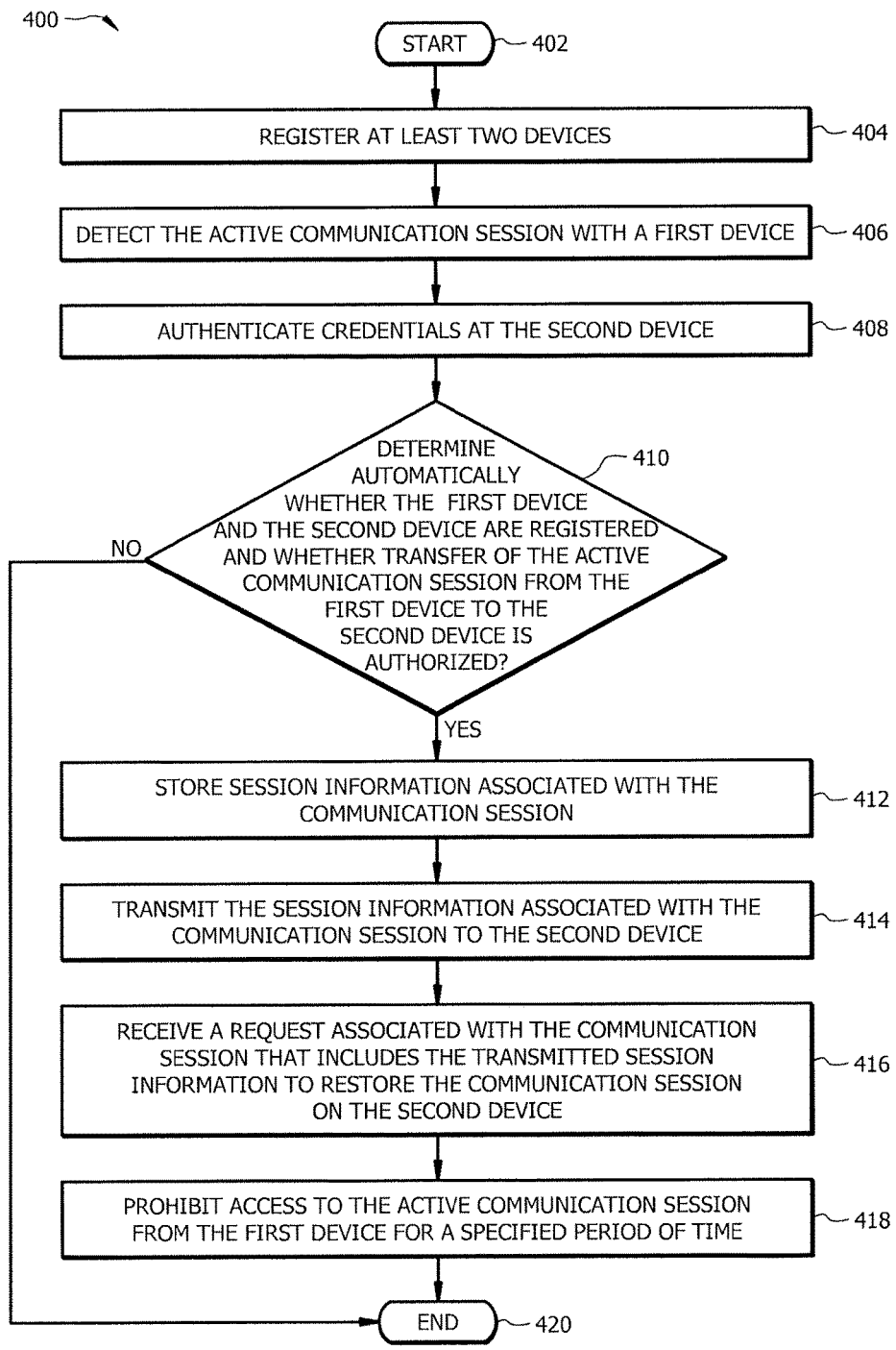
FIG. 4 illustrates a second example process flow for migrating a communication session between devices.

FIG. 4 is a process flow diagram illustrating a second process flow 400 for migrating an active communication session between at least two devices. The steps of process flow 400 correspond to an example sequence of steps for automatically migrating an active communication sessions between devices. Embodiments consistent with process flow 400 may permit the migration of an active communication session without requiring user intervention or knowledge that a migration of the communication session will occur. A process like process flow 400 may be implemented on an appropriate system, such as a private cloud server.

In the illustration, process flow 400 includes a number of steps for determining whether to authorize a migration of an active communication session, and once authorized, various steps for implementing a transfer of the migration an active communication session from one device to another device. As appropriate, network or user policies may dictate whether, when, and how migration of communication sessions may occur. For example, certain network policies may require the reentry of some or all user credentials to enable the restoration of a communication session on a different device. As another example, in particular embodiments, the user may be permitted to select whether to permit automatic migration of a communication session from another device or instead whether the user prefers a new communication session each time the system is accessed. As shown, the process flow starts at step 402, includes a registration step 404, a detect communication session step 406, an authentication step 408, a registration and authorization decision step 410, a store session information step 412, a transmit session information step 414, a request communication step 416, a prohibit access step 418, and ends at step 420. This collection of steps may be performed, for example, on a server, such as private cloud server 200 or application server 106.

In operation, process flow 400 starts at step 402. At step 404, the system may register two or more devices. For example, in registration step 402, the system may require a user to provide credentials on particular endpoint devices, such as desktop computer 108 or mobile device 112. Once authenticated, the system may generate and transmit a security token for storage on each device, which can be later used to authenticate the device as a registered device to the system. In particular implementations, the system may store an appropriate security token or key so that it can authenticate each device as authorized on subsequent access. In particular embodiments, the security token is a unique 128-bit encrypted key, such as an MD5 or SHA key. In this manner, each device may be identified and registered on the system as a candidate device for migration of communication sessions the network.

Next, process flow 400 continues to the detect communication session step 404. In this step, the system determines whether there is an active communication session with a first device. This step may include determining whether the user is authenticated or logged into the system and/or whether there are active session identifiers associated with the user and device. In particular embodiments, the system consults an appropriate database to determine whether there is an active communication session. For example, in particular embodiments, a database may maintain network logs that include communication session information for devices accessing the communication network. In certain embodiments, consulting the database may require communicating over a communication network to another server.

At step 408, process flow 400 authenticates the user's credentials at the second device. In certain embodiments, this may include a username, password, security questions, security token, security questions and answers, and/or biometric credentials (e.g. fingerprint). In particular implementations, the credentials used by the user at the second device may be some subset or all of the credentials that were used by the user to gain access to the system on the first device. In other embodiments, the credentials used by the user on the second device may be alternative credentials (e.g., biometric credentials) that operate as suitable alternatives for all or a subset of the credentials provided on the first device. In certain embodiments, step 408 may also include determining whether the user has permitted automatic migration of a communication session from the second device. Once the user is authenticated at step 408, the process flow proceeds to step 414.

Next, process 400 proceeds to registration and authorization decision step 410. In step 410, the system determines whether the first and second devices involved in the transfer communication session request are registered on the system. In particular implementations, the system may compare an identifier of the first and second device with a database to determine whether they are registered. For example, a security token located on the device may be used to determine whether the device has been registered. In other embodiments, the system may use an IP address, MAC address, or other suitable identifier of the device to determine whether it has been previously registered. In this step, the system may also determine whether the migration of the communication session is authorized. In certain embodiments, this may involve consulting appropriate fraud rules to determine whether either of the devices are blacklisted, compromised, or whether other policies or rules are violated. For example, migration of a communication session from one device to another may be permitted only when the two devices are within a predefined geographic distance of each other. In other embodiments, additional or alternative policies may be consulted as appropriate to determine whether migration of a communication should be permitted. In step 410, if it is determined that migration of the communication session is not authorized, then process flow 400 ends at step 420. If, however, process flow 400 determines that migration of the communication session is authorized, then process flow proceeds to step 412.

In step 412, process flow 400 stores session information associated with the active communication session. For example, in response to the detection of an active communication session on a first device in step 406 and the user authentication on a second device in step 408, the system may store the session identifier found in the header of messages associated with a communication session in a database. In other embodiments, the entire header may be stored in a database. For example, all or a portion of the header of messages associated with the communication may be stored as relevant session information. In other embodiments, additional or alternative information regarding the communication session may be stored to facilitate restoration of the communication session from a different device.

In step 414, the system may recognize that the same user associated with an communication session on the first device is attempting to access the communication session from the second device. As a result, the system may transmit, in step 414, the stored session information associated with the active communication session to the second device. The session information could include all or a subset of the header information used in the communication session between the first device and the system. In particular embodiments, the header information includes a session identifier of the active communication session. In alternative embodiments, the session information may only include a session identifier. Process flow then proceeds to step 416.

In step 416, the system receives a request from the second device that incorporates the session information that was transmitted by the system to the second device causing the communication session to be restored on the second device. Because the communication session remained active, the state of the user interaction with the system is not interrupted and the user may continue where it left off. In particular implementations, transfer of a communication session from one device to another must occur within a specified period of inactivity with respect to the communication session from the first device because the communication session may timeout for security reasons. The process flow 400 may then proceed to step 418.

In prohibit access step 418, the system may enforce a policy that prohibits access from the first device for a fixed period of time so that the communication session is not being accessed from two different devices at the same time. In certain embodiments, the system will enforce this policy by creating a fraud rule that blacklists an identifier associated with the first device for a specified period of time. In other embodiments, the system may automatically log the user out of the first device. In alternative embodiments, the first device is prohibited only if the geographic location of the first device and the second device outside of a permissible value of each other. In some implementations, this step is optional and may not be performed. Process flow 400 ends at step 420.

While flow chart 400 is illustrated as including specific steps arranged in a particular sequence, it should be understood that various embodiments may operate using any suitable arrangement and collection of steps capable of providing functionality such as that described. For example, authentication step 408 may be performed before or after detect communication session step 406 and/or determine registration and authorization decision step 410. As another example, determine registration and authorization decision step 410 may be performed before or after detect communication step 406 and/or authentication step 408. Accordingly, modifications, additions, or omissions may be made to flow chart 400 as appropriate.

Although the present disclosure describes several embodiments, it should be understood that a myriad of changes, substitutions, and alterations can be made without departing from the spirit and scope of the invention as defined by the appended claims.

What is claimed is:

1. An apparatus, comprising:
  a user interface operable to provide an active communication to a first device and a second device coupled to a network and one or more credentials from a user;
  a memory operable to store the credentials from a user, an identifier of the first device, an identifier of the second device, and session information associated with an active communication session;
  a network interface operable to communicate with the network;
  a processor communicatively coupled to the user interface, the memory, and the network interface, the processor operable to:
    register the first device and the second device;
    detect the active communication session with the first device;
    receive and authenticate credentials of the user at the second device;
    determine, using the identifier of the first device and the identifier of the second device, whether the first device and the second device are registered and whether transfer of the active communication session from the first device to the second device is authorized;
    if the first device and the second device are registered and transfer of the active communication session from the first device to the second device is authorized:
      store, in the memory, after authenticating credentials of the user at the second device, the session information corresponding to the active communication session with the first device;
      transmit the stored session information associated with the communication session to the second device;
      receive a request associated with the active communication session that includes the transmitted session information to restore the communication session on the second device based on the received request and the session information; and
      prohibit access to the active communication session from the first device for a predefined period of time.

2. The apparatus of claim 1, wherein the credentials of the user at the second device comprise at least one biometric credential.

3. The apparatus of claim 1, wherein the identifier of the first device or the identifier of the second device comprises at least one identifier selected from a group of an Internet Protocol (IP) address, a media access control (MAC) address, a geographic location, and/or a security token, associated with the first device or the second device respectively.

4. The apparatus of claim 1, wherein the session information comprises a session identifier of the active communication session.

5. The apparatus of claim 1, wherein registering the first device and the second device comprises:
  receiving a first request by the user to remember the first device;
  generating and transmitting a first security token to the first device for storage on the first device;
  receiving a second request by the user to remember the second device; and
  generating and transmitting a second security token to the second device for storage on the second device.

6. The apparatus of claim 1, wherein the processor is further operable to compare the identifier of the first device or the identifier of the second device against fraud rules to determine whether transfer of the communication session is authorized.

7. The apparatus of claim 1, wherein the identifier of the first device comprises a geographic location of the first device and the identifier of the second device comprises a geographic location of the second device, and the processor is further operable to:
  receive the geographic location of the first device;
  receive the geographic location of the second device; and
  authorize transfer of the active communication session from the first device to the second device if the geographic location of the first device and the geographic location of the second device are within a predefined value of each other.

8. A method, comprising:
  registering a first device and a second device coupled to a communication network in response to a user request;
  detecting an active communication session with the first device;
  receiving and authenticating credentials of the user at the second device;
  determining, using an identifier of the first device and an identifier of the second device, whether the first device and the second device are registered and whether transfer of the active communication session from the first device to the second device is authorized;
  if the first device and the second device are registered and transfer of the active communication session from the first device to the second device is authorized:
    storing, in a memory, after authenticating credentials of the user at the second device, session information corresponding to the active communication session with the first device;
    transmitting the stored session information associated with the communication session to the second device;
    receiving a request associated with the active communication session that includes the transmitted session information to restore the communication session on the second device based on the received request and the session information; and prohibiting access to the active communication session from the first device for a predefined period of time.

9. The method of claim 8, wherein the credentials of the user at the second device comprises at least one biometric credential.

10. The method of claim 8, wherein the identifier of the first device or the identifier of the second device comprises at least one identifier selected from a group of an Internet Protocol (IP) address, a media access control (MAC) address, a geographic location, and/or a security token, associated with the first device or the second device respectively.

11. The method of claim 8, wherein the session information comprises a session identifier of the active communication session.

12. The method of claim 8, wherein registering the first device and the second device comprises:
    receiving a first request by the user to remember the first device;
    storing, in a memory, the identifier of the first device and generating a first security token;
    transmitting the first security token to the first device for storage on the first device;
    receiving a second request by the user to remember the second device;
    storing, in the memory, the identifier of the second device and generating a second security token; and
    transmitting a second security token to the second device for storage on the second device.

13. The method of claim 8, further comprising comparing the identifier of the first device or the identifier of the second device against fraud rules to determine whether transfer of the communication session is authorized.

14. The method of claim 8, wherein the identifier of the first device comprises a geographic location of the first device and the identifier of the second device comprises a geographic location of the second device, and the method further comprises:
    receiving the geographic location of the first device;
    receiving the geographic location of the second device; and
    authorizing transfer of the active communication session from the first device to the second device if the geographic location of the first device and the geographic location of the second device are within a predefined value of each other.

15. A system, comprising:
    a first device and a second device associated with a user and coupled to a network;
    a data server comprising a processor operable to:
      register the first device and the second device;
      detect an active communication session with the first device;
      receive and authenticate credentials of the user at the second device;
      determine, using an identifier of the first device and an identifier of the second device, whether the first device and the second device are registered and whether transfer of the active communication session from the first device to the second device is authorized;
      if the first device and the second device are registered and transfer of the active communication session from the first device to the second device is authorized:
        store, after authenticating credentials of the user at the second device, the session information corresponding to the communication session with the first device;
        transmit the stored session information associated with the communication session to the second device;
        receive a request associated with the active communication session that includes the transmitted session information to restore the communication session on the second device based on the received request and the session information; and
        prohibit access to the active communication session from the first device for a predefined period of time.

16. The system of claim 15, wherein the credentials of the user at the second device comprises at least one biometric credential.

17. The system of claim 15, wherein the identifier of the first device or the identifier of the second device comprises at least one identifier selected from a group of an Internet Protocol (IP) address, a media access control (MAC) address, a geographic location, and/or a security token, associated with the first device or the second device respectively.

18. The system of claim 15, wherein the session information comprises a session identifier of the active communication session.

19. The system of claim 15, wherein registering the first device and the second device comprises:
    receiving a first request by the user to remember the first device;
    generating and transmitting a first security token to the first device for storage on the first device;
    receiving a second request by the user to remember the second device; and
    generating and transmitting a second security token to the second device for storage on the second device.

20. The system of claim 15, wherein the identifier of the first device comprises a geographic location of the first device and the identifier of the second device comprises a geographic location of the second device, and the processor is further operable to:
    receive the geographic location of the first device;
    receive the geographic location of the second device; and
    authorize transfer of the active communication session from the first device to the second device if the geographic location of the first device and the geographic location of the second device are within a predefined value of each other.

* * * * *